US012367211B2

(12) United States Patent
Hanby, IV et al.

(10) Patent No.: US 12,367,211 B2
(45) Date of Patent: Jul. 22, 2025

(54) SYSTEM AND METHOD FOR CONTENT CREATION AND DELIVERY

(71) Applicant: Hanby Technologies, Inc., Austin, TX (US)

(72) Inventors: John Byron Hanby, IV, Austin, TX (US); Robert B. Blount, Austin, TX (US)

(73) Assignee: Hanby Technologies, Inc., Austin, TX (US)

( * ) Notice: Subject to any disclaimer, the term of this patent is extended or adjusted under 35 U.S.C. 154(b) by 90 days.

(21) Appl. No.: 18/096,492

(22) Filed: Jan. 12, 2023

(65) Prior Publication Data

US 2023/0244689 A1    Aug. 3, 2023

Related U.S. Application Data

(63) Continuation of application No. 16/434,293, filed on Jun. 7, 2019, now Pat. No. 11,556,559.

(60) Provisional application No. 62/727,803, filed on Sep. 6, 2018, provisional application No. 62/835,039, filed on Apr. 17, 2019.

(51) Int. Cl.
| | |
|---|---|
| *G06F 16/25* | (2019.01) |
| *G06F 16/9035* | (2019.01) |
| *G06F 16/9038* | (2019.01) |
| *G06F 16/906* | (2019.01) |
| *G06F 21/10* | (2013.01) |
| *G06N 20/00* | (2019.01) |

(52) U.S. Cl.
CPC ........ *G06F 16/258* (2019.01); *G06F 16/9035* (2019.01); *G06F 16/9038* (2019.01); *G06F 16/906* (2019.01); *G06F 21/10* (2013.01); *G06N 20/00* (2019.01)

(58) Field of Classification Search
CPC .. G06F 16/258; G06F 16/906; G06F 16/9038; G06F 16/9035; G06F 21/10; G06N 20/00
USPC ........................................................ 707/756
See application file for complete search history.

(56) References Cited

U.S. PATENT DOCUMENTS

| | | | |
|---|---|---|---|
| 9,620,168 B1 * | 4/2017 | Townsend | ................. G06T 7/90 |
| 9,721,165 B1 * | 8/2017 | Bentley | ................. G11B 27/327 |
| 10,255,946 B1 * | 4/2019 | Andrizzi | .............. G11B 27/026 |
| 10,319,410 B1 * | 6/2019 | Townsend | ............. G11B 27/30 |
| 11,080,351 B1 | 8/2021 | Yang et al. | |

(Continued)

OTHER PUBLICATIONS

Smith, John R., et al., "Interactive Search Fusion Methods for Video Database Retrieval", International Conference on Image Processing (ICIP 2003), Barcelona, Spain, Sep. 14-17, 2003, pp. I-741-I-744.*

(Continued)

*Primary Examiner* — Robert Stevens
(74) *Attorney, Agent, or Firm* — Pillsbury Winthrop Shaw Pittman LLP

(57) ABSTRACT

A system and methods for efficiently and consistently creating and delivering content tailored to a user's specific needs and channel of distribution. The system generates coherent, precise, and logical content that is in full compliance with the relevant policies, rules, regulations, and laws of users of the system. The content created and delivered by the system may be in any form, such as, but not limited to a video, a script, a press release, a social media post, and a keynote speech.

18 Claims, 11 Drawing Sheets

(56) References Cited

U.S. PATENT DOCUMENTS

| | | | | |
|---|---|---|---|---|
| 11,158,344 B1* | 10/2021 | Townsend | | H04N 5/91 |
| 2006/0015904 A1* | 1/2006 | Marcus | | H04N 7/16 |
| | | | | 348/E7.071 |
| 2008/0215964 A1 | 9/2008 | Abrams et al. | | |
| 2012/0151217 A1* | 6/2012 | Porter | | H04N 21/4542 |
| | | | | 713/178 |
| 2014/0101551 A1* | 4/2014 | Sherrets | | G11B 27/031 |
| | | | | 715/723 |
| 2014/0122592 A1 | 5/2014 | Houston et al. | | |
| 2015/0051934 A1* | 2/2015 | Chakra | | G06Q 10/1097 |
| | | | | 705/7.21 |
| 2015/0135068 A1* | 5/2015 | Chiu | | G06F 3/0484 |
| | | | | 715/716 |
| 2016/0019202 A1* | 1/2016 | Adams | | H04N 21/8547 |
| | | | | 704/9 |
| 2016/0110313 A1* | 4/2016 | Prakash | | G06F 30/00 |
| | | | | 715/202 |
| 2017/0353406 A1 | 12/2017 | Ramamurthy et al. | | |
| 2017/0364532 A1 | 12/2017 | Mahadevan et al. | | |
| 2018/0232464 A1* | 8/2018 | Looney | | G06T 19/003 |
| 2018/0374375 A1* | 12/2018 | Doucette | | G06Q 10/06398 |
| 2019/0034826 A1 | 1/2019 | Ahmad et al. | | |
| 2019/0082236 A1* | 3/2019 | Salim | | H04N 21/6587 |
| 2019/0325626 A1 | 10/2019 | Tao | | |
| 2021/0382929 A1 | 12/2021 | Zhao et al. | | |

OTHER PUBLICATIONS

Schödl, Arno, et al., "Machine Learning for Video-Based Rendering", Advances in Neural Information Processing Systems, vol. 13, © 2000, 7 pages.*

Agarwala, Aseem, et al., "Panoramic Video Textures", SIGGRAPH '05; SIGGRAPH 2005 Papers, ACM Digital Library, Jul. 1, 2005, pp. 821-827.*

Flagg, Matthew, et al., "Human Video Textures", I3D '09; Proc. of the 2009 Symposium on Interactive 3D Graphics and Games, ACM Digital Library, Feb. 27, 2009, pp. 199-375.*

Contentmarketinginstitute.com; retrieved on Sep. 29, 2023 https://contentmarketinginstitute.com/articles/content-creation-robots-examples/, 7 pages.

Digital.gov; retrieved on Sep. 29, 2023 https://digital.gov/2015/08/10/the-content-corner-can-automated-content-creation-help-your-agency/, 5 pages.

Zapier.com, Zapier Inc.; retrieved on Sep. 29, 2023 https://zapier.com/blog/updates/362/contentful-integrations, 2 pages.

* cited by examiner

SYSTEM AND METHOD FOR CONTENT CREATION AND DELIVERY

CROSS-REFERENCE TO RELATED APPLICATIONS

This patent application is a continuation of U.S. patent application Ser. No. 16/434,293 filed 7 Jun. 2019, titled "SYSTEM AND METHOD FOR CONTENT CREATION AND DELIVERY," which claims the benefit of U.S. provisional application 62/727,803 filed 6 Sep. 2018, titled "SYSTEM AND METHOD FOR CONTENT CREATION AND DELIVERY," and U.S. provisional application 62/835,039 filed 17 Apr. 2019, titled "SYSTEM AND METHOD FOR CONTENT CREATION AND DELIVERY." The entire content of each afore-mentioned patent filing is hereby incorporated by reference.

FIELD

The present disclosure relates to a system and methods for creating and delivering content.

BACKGROUND

Current content management systems exist, but fail to effectively create and synthesize new pieces of content in and from a variety of different mediums, such as text to video, or social media posts, or speech. Specifically, existing systems fail to maintain proper context across various applications since they are typically not readily customizable or adaptable. The result is often the delivery of an incoherent and disjointed message, or a message useable in only one or very limited contexts resulting in much wasted time, resources, and money. Because of these limitations of current content management systems, many organizations must use multiple separate content management systems and content creation systems to manage and create content for all of their different use cases like managing content on a website platform, video management platform, video creation platform, document creation software, document management software, team review and collaboration tools, Customer Relationship Management (CRM) platform, business archive and storage platforms, etc. This becomes problematic when multiple systems must be kept up to date with large amounts of content.

Conventional content creation systems rely on adaptations to use pre-existing databases for transmitting data throughout the systems to create content. However, these systems are not adapted to produce a wide range of useful custom content. Instead, the custom content created by these conventional systems is often unintelligible and has an artificial feel. Specifically, existing content creation systems are not usually designed for mass customization, and taking into account human reaction, person-to-person communication nor do they deliver consistent, genuine, and psychologically-reinforced messaging for their customers.

Accordingly, there exists a need for a system and method for efficiently and consistently creating and delivering content tailored to a user's specific needs and channel of distribution. The system and method should generate coherent, meaningful, precise, and logical content that is in full compliance with the relevant policies, rules, regulations, and laws of the user.

SUMMARY

What is provided is a system and methods for efficiently and consistently creating and delivering content tailored to a user's specific needs and channel of distribution. The system generates coherent, precise, and logical content that is in full compliance with the relevant policies, rules, regulations, and laws of users of the system.

In an embodiment, the computer-implemented method for content creation includes capturing data on a computing device, wherein the captured data corresponds to one or more desired outcomes; filtering and arranging at least a portion of the captured data; storing the filtered data in a database on the computing device; processing and synthesizing the filtered data to transform the filtered data into a new dataset; inserting one or more tags to the new dataset, wherein the new dataset is assembled based on the relationship, order, and/or prioritization of the tags in the new dataset; and storing the tagged dataset in the database for future content creation and delivery to a user.

In an embodiment, the computer-implemented method for delivering content includes receiving a user's content request on a computing device; filtering and arranging the data corresponding to one or more outcomes requested by the user; processing and synthesizing the filtered data to prepare one or more pieces of content associated with the one or more outcomes; converting the content into a desired format; and formatting the content for delivery to the user.

In an embodiment, a system for creating and delivering content includes a computing device having one or more databases configured to store data associated with the creation and delivery of content; one or more data capturing mechanisms; and one or more servers configured to review, synthesize, and deliver data obtained from the databases, to create content relevant to a user's desired outcomes, to convert data into one or more pieces of content, to convert the content into a desired format for delivery, to insert a unique tag to the content, and to deliver the content to a user device; and a remote server in communication with the computing device via a network.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

Figure 1:
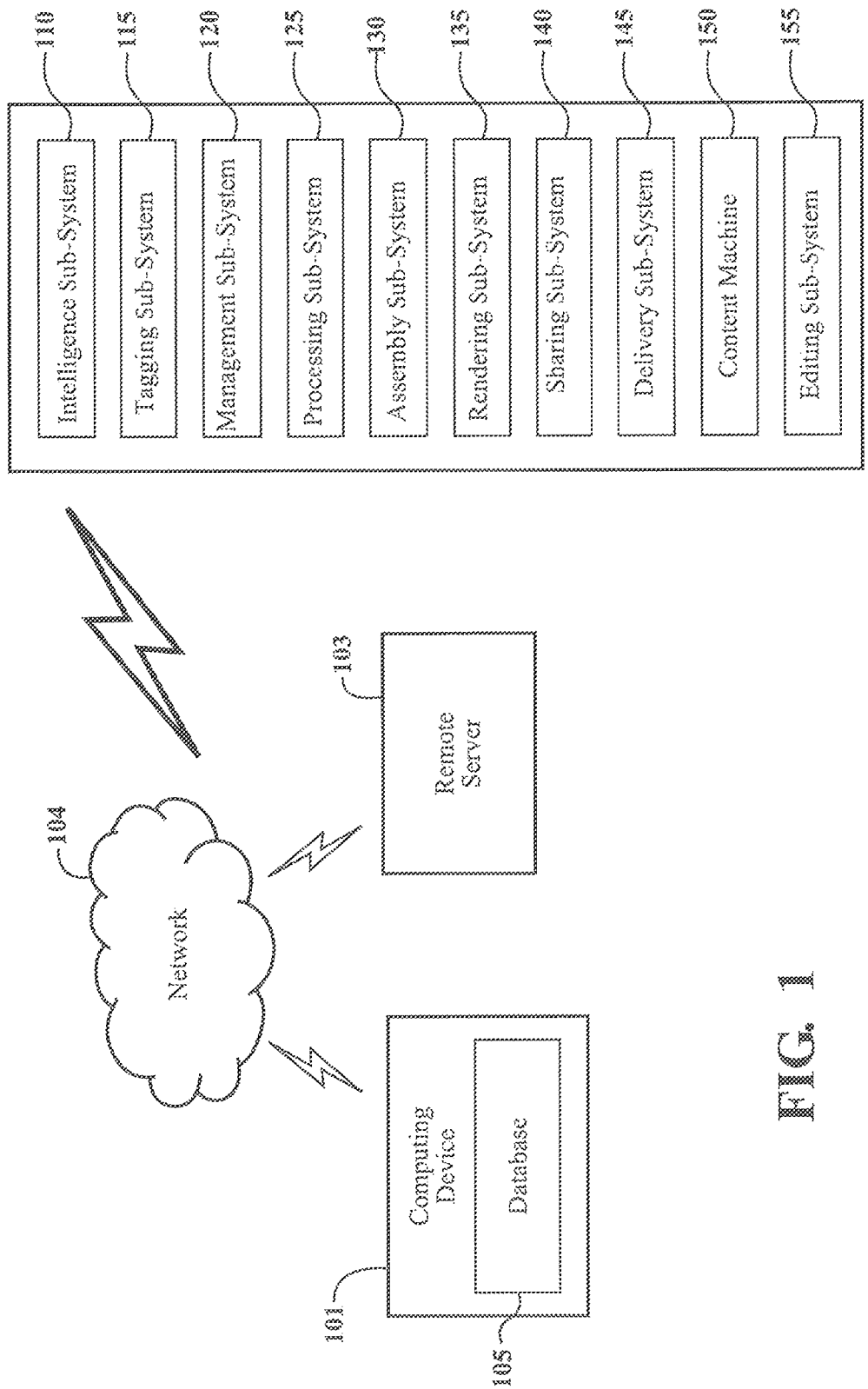
FIG. 1 is a block diagram schematic illustrating an exemplary system for creating and delivering content.

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and components have not been described in detail so as not to obscure the examples defined by the claimed subject matter.

Some portions of the detailed description that follow are presented in terms of algorithms and/or symbolic representations of operations on data bits and/or binary digital signals stored within a computing system, such as within a computer and/or computing system memory. An algorithm is here and generally considered to be a self-consistent sequence of operations and/or similar processing leading to a desired result. The operations and/or processing may take the form of electrical and/or magnetic signals configured to be stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing," "calculating", "determining" and/or the like refer to the actions and/or processes of a computing platform, such as a computer or a similar electronic computing device that manipulates and/or transforms data represented as physical electronic and/or magnetic quantities and/or other physical quantities within the computing platform's processors, memories, registers, and/or other information storage, transmission, and/or display devices.

Unless specifically stated otherwise, as apparent from the following discussion, it is appreciated that throughout this specification a computing platform includes, but is not limited to, a device such as a computer or a similar electronic computing device that manipulates and/or transforms data represented by physical, electronic, and/or magnetic quantities and/or other physical quantities within the computing platform's processors, memories, registers, and/or other information storage, transmission, reception and/or display devices. Accordingly, a computing platform refers to a system, a device, and/or a logical construct that includes the ability to process and/or store data in the form of signals. Thus, a computing platform, in this context, may comprise hardware, software, firmware and/or any combinations thereof. Where it is described that a user instructs a computing platform to perform a certain action, it is understood that "instructs" may mean to direct or cause to perform a task as a result of a selection or action by a user. A user may, for example, instruct a computing platform embark upon a course of action via an indication of a selection, including, for example, pushing a key, clicking a mouse, maneuvering a pointer, touching a touch pad, touching a touch screen, acting out touch screen gesturing movements, maneuvering an electronic pen device over a screen, verbalizing voice commands, and/or by audible sounds. A user may include an end-user.

Flowcharts, also referred to as flow diagrams by some, are used in some figures herein to illustrate certain aspects of some examples. Logic they illustrate is not intended to be exhaustive of any, all, or even most possibilities. Their purpose is to help facilitate an understanding of this disclosure with regard to the particular matters disclosed herein. To this end, many well-known techniques and design choices are not repeated herein so as not to obscure the teachings of this disclosure.

Throughout this specification, the term "system" may, depending at least in part upon the particular context, be understood to include any method, process, apparatus, and/or other patentable subject matter that implements the subject matter disclosed herein. The subject matter described herein may be implemented in software, in combination with hardware and/or firmware. For example, the subject matter described herein may be implemented in software executed by a hardware processor.

The system and methods disclosed herein provide for the efficient creation and delivery of content tailored to a user's specific needs and channels of distribution. The content built using the system is created by identifying the objective of each self-contained piece of communication content of a user. The content may be expressed in any type of form, such as text, videos, images, audio, code, virtual reality, and/or combinations thereof. An example of such communication content may be a company's mission statement. In some embodiments, these pieces are known as blocks or FractalBlocks™.

To create and identify the blocks, the system breaks down the content used by a specific user communication objectives and then identifies and removes all duplicate communication objectives to create a list of all possible blocks. For example, if a mission statement is found on a user's website and brochure, it is deemed to be the same communication objective in both locations. The system disclosed herein would then remove all duplicates of that communication objective to leave a single communication object, which may translate to a "Mission Statement FractalBlock™."

Once lists of each user's blocks are created, the system disclosed herein cross-references the lists between users to create a master list of all blocks, in which duplicates are removed. The result is only one copy of each unique block.

Each piece of communication content in the system is associated with objectives a user of the system is attempting to achieve based on the result of the user receiving the communication content. In some embodiments, these objectives are known as FractalOutcomes™. For example, a user who experiences a specific communication content (i.e. FractalBlock™) about the key selling points of a product would increase the likelihood of that product being purchased. As a result, that specific communication content would have an outcome (i.e. FractalOutcome™) of improving sales associated with that communication content.

In some examples, multiple FractalOutcomes™ are associated with each FractalBlock™. In other examples, multiple FractalBlocks™ can share the same FractalOutcomes™, A list of outcomes/FractalOutcomes™ may be created for each user, wherein the blocks/FractalBlocks™ that would further the objective of communicating a FractalOutcome™ are identified and marked as being associated with those specific blocks.

In order to achieve an outcome beyond merely communicating an idea, such as, but not limited to building user trust or educating users on the value of particular product or service, multiple pieces of communication content are combined together. When combined in a specific order, these pieces of communication content create a chain. The chain holds multiple pieces of communication content in a way that yields a piece of coherent, meaningful, logical content that is easy to understand. An example of the chain may involve a company building trust with a user by communicating the company's mission, values, passion, and commitment to user's success. In some embodiments, the chain is known as a FractalChain™.

When multiple chains are combined together in specific order, the chains create a "container" using the system that results in a coherent, meaningful, logical, and easy to follow story/message. For example, a company may sell a user a product by communicating the company's trustworthiness, product significance, use case, etc. In this example, each of the company's trustworthiness, product significance, and use case are individually chains, but become a "container" when combined together. In some embodiments, the container is known as a Master Content Container™.

The relationship, order, and prioritization of the blocks and chains in this system is done in such a manner that the resulting piece of content is adapted to be readily understandable by users. Also, the content found in the container is arranged to achieve a specific and predetermined objective based on the specific needs and desires of the users of the system. This objective is achieved through a logical progression of concepts and ideas communicated through the chain. In some embodiments, this method is known as Fractal Built-To-View™.

Referring to FIG. 1, FIG. 1 shows a block diagram schematic illustrating a system 100 for the creation and delivery of content tailored to a user's specific needs. The system 100 includes at least one computing device 101, one or more servers 103, and one or more databases 105, wherein the components of the system 100 are communicatively coupled to each other via a network 104.

The servers 103 may be part of a network-based system. For example, the network-based system may include a cloud-based server system. Communication networks may be any combination of wired and/or wireless LAN, cellular, and/or Internet communications and/or other local and/or remote communications networks known in the art.

The computing device 101 may be a mobile device, a tablet, a desktop or laptop computer, and others known in the art. The computing device 101 may include a camera, a virtual camera, a keyboard and mouse, and one or more sensors. The computing device 101 is operable to perform the steps or otherwise provide the functionality discussed herein. In some embodiments, the system may be known as FractalForge™.

The content created and delivered by the system 100 may be in any form, such as, but not limited to a video file, a segment of text, code, an audio file, and an image file.

The servers 103 may be adapted for remote communication with the computing device 101. The servers 103 may also be adapted for editing blocks, such as video blocks, encoding the blocks into a video-friendly format, and other tasks related to the editing and modification of the blocks. The servers 103 may be adapted to process other mediums of the blocks, such as virtual reality, augmented reality, 3-D, modeling data, and holograms.

The databases 105 are configured to store the data pertaining to the creation and delivery of content to users. The system 100 may also comprise one or more database backup systems or memory adapted to store a backup of the data. Memory may be any type of local, remote, auxiliary, flash, cloud, or other memory known in the art. Only non-transitory computer readable storage media is intended within the scope and spirit of the claimed subject matter.

Figure 2:
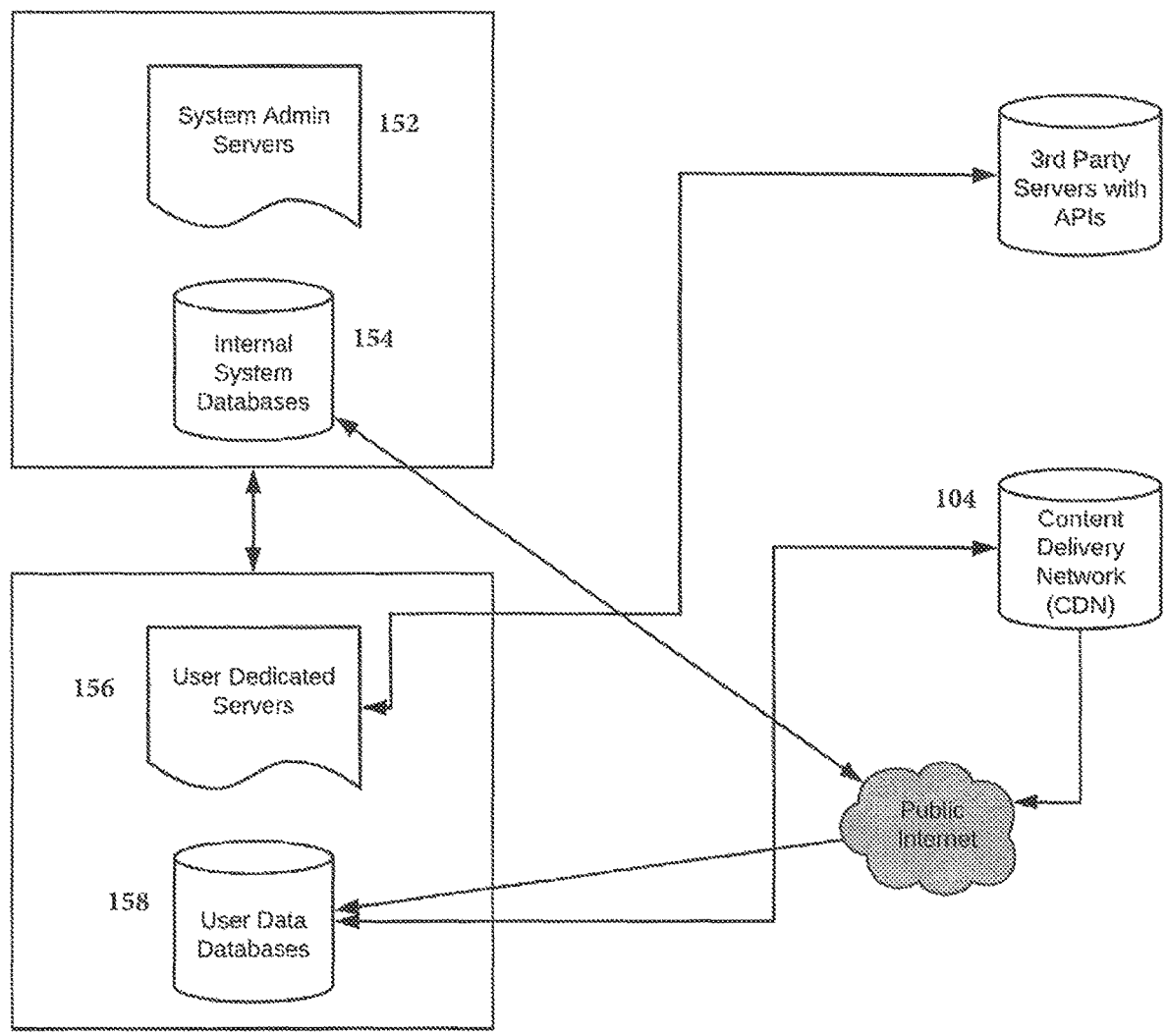
FIG. 2 is a block diagram schematic illustrating servers and databases in the system of FIG. 1.

As best shown in FIG. 2 and as a non-limiting example, the servers 103 may comprise one or more system administration servers 152 and the databases 105 may comprise one or more internal system databases 154. The system administration servers 152 and the internal system databases 154 are configured to communicate with one or more user dedicated servers 156 and one or more user data databases 158 via the network 104 to deliver content to and from the public Internet. In the embodiment shown in FIG. 2, the network 104 is known as a content delivery network (CDN).

Each of the system administration servers 152 and the user dedicated servers 156 may be configured to run one or more sub-systems of the system 100, such as the sub-systems shown in FIG. 1, based on the individual needs of users. In some embodiments, the user dedicated servers 156 may interface with third-party servers via a network to increase the functionality of the system 100 through APIs.

Each of the internal system databases 154 and the user data databases 158 may include one or more databases with multiple different data sets. In some embodiments, the internal system databases 164 may collect and store data from the public internet for use in one or more sub-systems of the system 100, as shown in FIG. 1.

The system 100 also includes an intelligence sub-system 110 that is adapted to execute the machine learning-based and artificial intelligence-based tasks of the system 100. The intelligence sub-system 110 facilitates the creation of content relevant to the desired outcomes of a user. As such, the intelligence sub-system 110 may be educated by the user and eventually understand a user's communication strategy, personality, mannerisms, emotional drivers, and other traits that are required for something to be perceptible as human. The result may be the creation of new (not previously written) blocks in the system. In some embodiments, the intelligence sub-system 110 is known as the FractalIntelligence System™. The intelligence sub-system 110 includes an intelligence server, wherein the intelligence server may communicate with third-party servers that may be integrated with the intelligence sub-system 110.

In addition to adding new types of blocks, chains, master content containers, block feedback and review steps, and data points for the intelligence sub-system 110. The system 100 may also accept requests from users for new versions of the aforementioned features via a feedback request form. The form may be processed by a feature request system, wherein key words from the request are cross-referenced with the existing features of the system 100. The requests may then be sorted based on the number of correlations with the existing features or other valued parameters.

Figure 3:
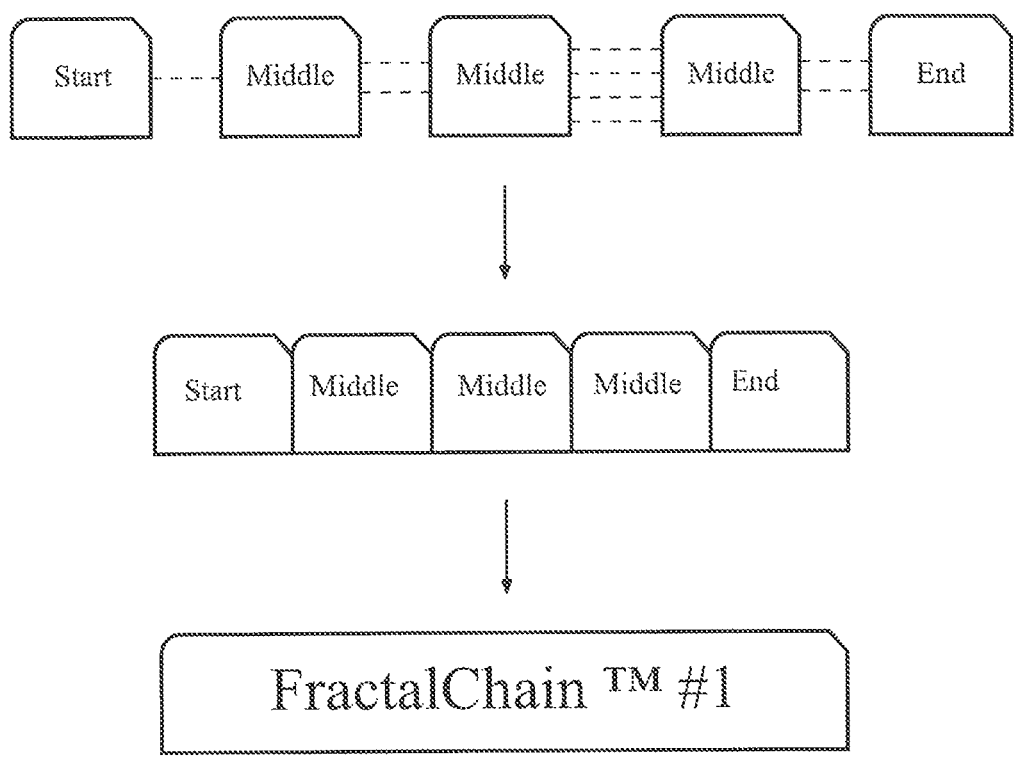
FIG. 3 is a schematic illustrating a chain of ordered blocks with relevant tags from the system of FIG. 1.

The system 100 further includes a tagging sub-system 116 adapted for tagging all blocks in the system 100 with relevant information. As used herein, a "tag" refers to a piece of data that determines the relationship, order, and prioritization between multiple outcomes, blocks, and chains. For example, a block with a tag that equals "End" will always appear at the end of a chain in the system 100, as shown in FIG. 3. In some embodiments, the tag is known as a FractalTag™ and the tagging sub-system 115 is known as the Fractal Tagging System™. The blocks may be assembled based on the tags using an assembly sub-system 130 found in the system 100.

In some examples, the tags ensure that only those blocks that are relevant to the user's specific outcome request will be added to the chains in the system 100. In some embodiments, these tags are known as FractalOutcome™ Tags. Each block may be preconfigured with these tags to contain all relevant outcomes in the system. Each of the outcomes in the system may be preconfigured to contain all relevant blocks.

There is no limit on the amount of these tags that may be associated with each block or each outcome in the system 100. However, there is a limit as to number of relevant outcomes that can logically be associated with each block to further the created chain in the system. For example, a block (i.e., FractalBlock™) would have preconfigured associations with all outcomes (i.e. FractalOutcomes™) in which a company's mission statement would improve the likelihood of achieving those outcomes. In this example, the block associated with the company Mission may be tagged to be associated with the company's trust building or product quality chains. The chains could then be combined to deliver FractalOutcomes™.

In some examples, tags for the blocks in the system 100 (i.e., FractalBlock™ Tags) are preconfigured associations between two blocks, such as FractalBlocks™. These types of tags ensure that the blocks are added to the chain, such as a FractalChain™, in a way that is logical and readily understood. Each of the blocks in the system 100 may be pre-configured with the tags to contain all relevant block linkage opportunities. There is no limit to the number of tags each block in the system 100 can contain. However, the tags help ensure that a block is logically associated with another block to further the created chain for accomplishing an outcome in the system 100. For example, a block that acts as the introduction to the content would have a tag that prevents it from connecting to a block that is the closing statement of the content as this would often cause the content to not make sense.

In some examples, tags for the chains in the system 100 (i.e., FractalChain™ Tags) are preconfigured associations between two chains (i.e., FractalChains™). These tags ensure that chains are properly added to the appropriate containers in the system. Each chain in the system 100 may be assigned tags based on the block at the beginning of the chain, the block at the end of the chain, and the blocks contained within the full chain. There is no limit to the number of chain tags that each chain has associated with it.

For example, a FractalChain™ that houses "company overview information" may have a FractalChain™ tag that prevents it from connecting to the end of a FractalChain™ that is giving a detailed overview of a product due to the importance of sharing the credentials of a company prior to trying to sell a user a new product.

In some examples, tags use the intelligence sub-system 110 to analyze the combination of multiple blocks into chains in the system to ensure the proper flow of content. Examples include ensuring that each block does not start off with "Our company," but instead using the words "We" or the company's name, to vary the opening of each paragraph to provide a coherent and genuine communication experience. In some embodiments, these tags are known as FractalFlow™ tags.

In some examples, the system 100 uses linking words/content for each content medium to enable blocks to flow better based on the tags in the system 100. For example, the predefined beginning of blocks may be replaced to improve flow and make a piece of content more genuine. Instead of starting each paragraph with the word "We," the paragraphs may start with the term "in addition," "We", or other linking phrases like, "Also" and "Furthermore." In some embodiments, these linking words/content are junctions known as FractalJunctions™.

In some embodiments, tags are added to each individual block with certain information about the manifestations of content beyond the text in the block, itself. For example, a manifestation may be a tag that designates a company's CEO to be the speaker for the video version of a specific block. In some examples, these tags are known as Fractal M-Tags™ or Fractal Manifestation Tags™.

In some examples, the system 100 uses a tag that serves as a data point that is used to combat growth, turnover, and organizational changes in the personnel within the organization. The tag is adapted to track and notify when organizational changes occur to ensure continuity and proper representation across the organization at all times. In addition to tracking the changes, this tag will set a priority level based on which updates are more critical. In some embodiments, this tag is known as a Fractal ET Tag™ or a Fractal Employee Trajectory Tag™.

For example, if the head of sales for a company is the representative of some blocks associated with the company's sale department and the head of sales is promoted to CEO, it no longer makes sense for this individual to still be the representative of the blocks associated with the company's sales department. As such, the Fractal ET Tag™ will serve to indicate that the new head of sales must update the blocks of the sales department with himself as the new representative. The former head of sales/new CEO must then update the blocks associated with the CEO of the company.

In some examples, the system 100 uses a tag used to identify blocks in the system 100 that may have multiple representatives speaking the same text. For example, the tag may be used for two different operations managers in a computer manufacturer company giving a commitment to fast delivery of the order, where one manager is in charge of the notebook manufacturing process and the other manager is in charge of the desktop manufacturing process. In some embodiments, this tag is known as a Fractal Multi-Version Tag™.

In some examples, the system 100 uses a tag to reference any required legal documents related to the use of a block in the system 100. An example of such a tag is a talent release form given by an actor to consent to using his image within a block. In some embodiments, this tag is known as a Fractal Legal Tag™.

The system 100 further comprises a management sub-system 120 adapted for managing and executing the review and approval of data and information obtained from the databases 105. The management sub-system 120 manages the content found in a variety of mediums, such as video, audio, segments of text, etc., and communicates with the intelligence sub-system 110. Blocks may have physical manifestations of the text-based content that are taken into accounting by assessing the manifestation tags added to each individual block. These tags govern how the content is captured. An example is determining if live action filming is required for that block.

The management sub-system 120 includes one or more servers configured to communicate with one or more servers on a processing sub-system 125 and to communicate with third-party database management tools. The processing sub-system 125 is configured to receive and process requests for content from user devices and to communicate with external servers or software and any computing device.

A rendering sub-system 135 within the system 100 is responsible for rendering and compiling the data in the medium requested. For example, the rendering sub-system 135 may create blocks and allow the system 100 to combine the blocks with other blocks. The rendering sub-system 135 may communicate with third-party software and may be integrated with third-party servers.

The system 100 also comprises a sharing sub-system 140 adapted for facilitating the sharing of content between authorized users. Some tags in the system 100 may be used to designate the use of a block either internal or external to a user. The use of the blocks may be restricted within a user (i.e. company) to select employees, while other blocks may be designated for use with certain partners or resellers, or by anyone within the public. The result is that each block may have complete security within the organization, allowing user information to be kept safe and protected when needed, while delivering benefit to partners and resellers, when applicable.

In some examples, the ability to share tags may allow users to verify the authenticity of the blocks in the system 100 using a signed security protocol technology, such as Blockchain™. In some embodiments, this tag is known as a Fractal Sharing Tag™. The signed security protocol technology may be integrated into the system 100 from initial block creation, through all stages of production, review, and eventual distribution. Depending on the privacy and sharing setting associated with each block, the user has the ability to determine who may access/view a particular block and at what frequency. The system 100 allows any viewer to see the journey that a particular block took throughout the various production stages, including who approved the block and whether there were any stages generated by artificial intelligence.

In some embodiments, signed security data of the block's journey may include information, such as the name of the individual that approved the block for its final release. Authenticity may be verified via a unique identifier, such as a logo. The unique identifier may be expanded to reveal additional detailed information via a graphical user interface, such as a data inspector window.

In order to manage the complexity of a mufti-staged approval process and to ensure that content is accurate, legal, and of the appropriate quality, the system 100 may be configured to designate specific users with various responsibilities and authority in reviewing and approving content blocks for distribution.

In an embodiment, the sharing sub-system 140 may include a set of instructions and sub-systems that allow the sharing sub-system 140 to identify any existing content on the Internet that is a fraudulent representation of a user's authentic content. For example, the sharing sub-system 140 may scan websites for content that references speaking on behalf of or with authority/permission from a user's company.

The identified content will then be analyzed and compared with existing block data and other proprietary information to determine if the content has been catalogued as part of the system 100. If the content has been identified to be part of the system 100, a set of verification sequences are initiated to determine if the content is genuine and authentic. If the system 100 determines that the content is genuine, the content is marked accordingly and the associated meta-information is captured via a capture sub-system. If the content is not determined to be part of the company's approved communication blocks database, the content is marked accordingly and all associated meta-information is captured.

The capture sub-system may transmit data to the tagging sub-system 115 to provide data to help apply tags in the system 100. The capture sub-system may communicate with other websites, the IoT, third-party sensors, third-party measurement devices, and cameras.

After the content is flagged and the meta-information has been captured, the system 100 will either initiate a content removal process, provide a fraudulent content designation to the content, or provide an authentic content designation to the content. In some embodiments, this is performed automatically. In other embodiments, this is performed manually via human interaction. The amount of automation used by the system 100 may be controlled by the user based on the user's requirements and needs.

In some embodiments, the signed security verification of authenticity feature of the system 100 is connected to systems that display the content to the user. Through the Fractal Sharing Tag™, a user is able to set specific viewing conditions for the block that restricts how the block may be viewed and accessed. The integrity and authenticity of the content may be protected by an encryption algorithm that integrates with both the content (i.e. video data) and the displayer of such content (i.e. a video player). The system 100 may be configured to only recognize content that follows the required encryption format, including, but not limited to AES128, AES256, AES512, SHA256, and SHA512 with proper authorizations and access keys. If the content is downloaded to a personal computing device, the content will not be able to be modified and will only be able to be viewed or distributed in its entirety. If a user allows the piece of content to be modified by the public, the association with the signed authenticity for verified authenticity is broken and subsequent distribution of that piece of content will lack the verification indicator or offer a new verification indicator based on the type of modification and credentials of the user.

The Fractal Sharing Tag™ is configured to allow a user to determine the number of times a piece of content may be opened, accessed, viewed, copies, shared, duplicated, and the like, before the file becomes inaccessible by means of self-encryption, self-deletion, or other similar security measures. The Fractal Sharing Tag™ is also configured to allow a user to set certain key parameters, such as the amount of time the content will exist before it may no longer be accessed.

Yet further, the system 100 comprises a delivery sub-system 145 having a server adapted to deliver finalized content in the medium requested by the user to the network 104. Some examples of the medium of delivery include, but are not limited to a video file, a written document, an audio file, or other functionally equivalent format. The successful delivery of a message through a medium depends on the context of that situation and the amount of time available to communicate that message.

Due to the variety of possible mediums/file formats for content delivery, the delivery sub-system 145 may output the data in commonly-used formats for single use, while also providing users with the ability to export the content in a proprietary data file extension that would allow for dynamic delivery of content to the application housing the data. In an embodiment, the file extension is known as ".fractal" file format. The file extension may be configured to automatically update the content found within the data container whenever connected to the Internet.

For example, if a user imports a "company_mission_statement_text.fractal" file, which contains the user's mission statement, into a document, then the user's mission statement is displayed in that document. If the user's mission statement is changed after the document is completed, the file is updated to contain the revised mission statement when the document is opened and connected to the Internet. The dynamic delivery of content allows for all of the user's relevant documents to be automatically updated in real time accordingly once the document is opened.

The delivery sub-system 145 may communicate with external software systems and any device used for consuming content, such as, any computing device, the IoT, a television, and the like.

Figure 11:
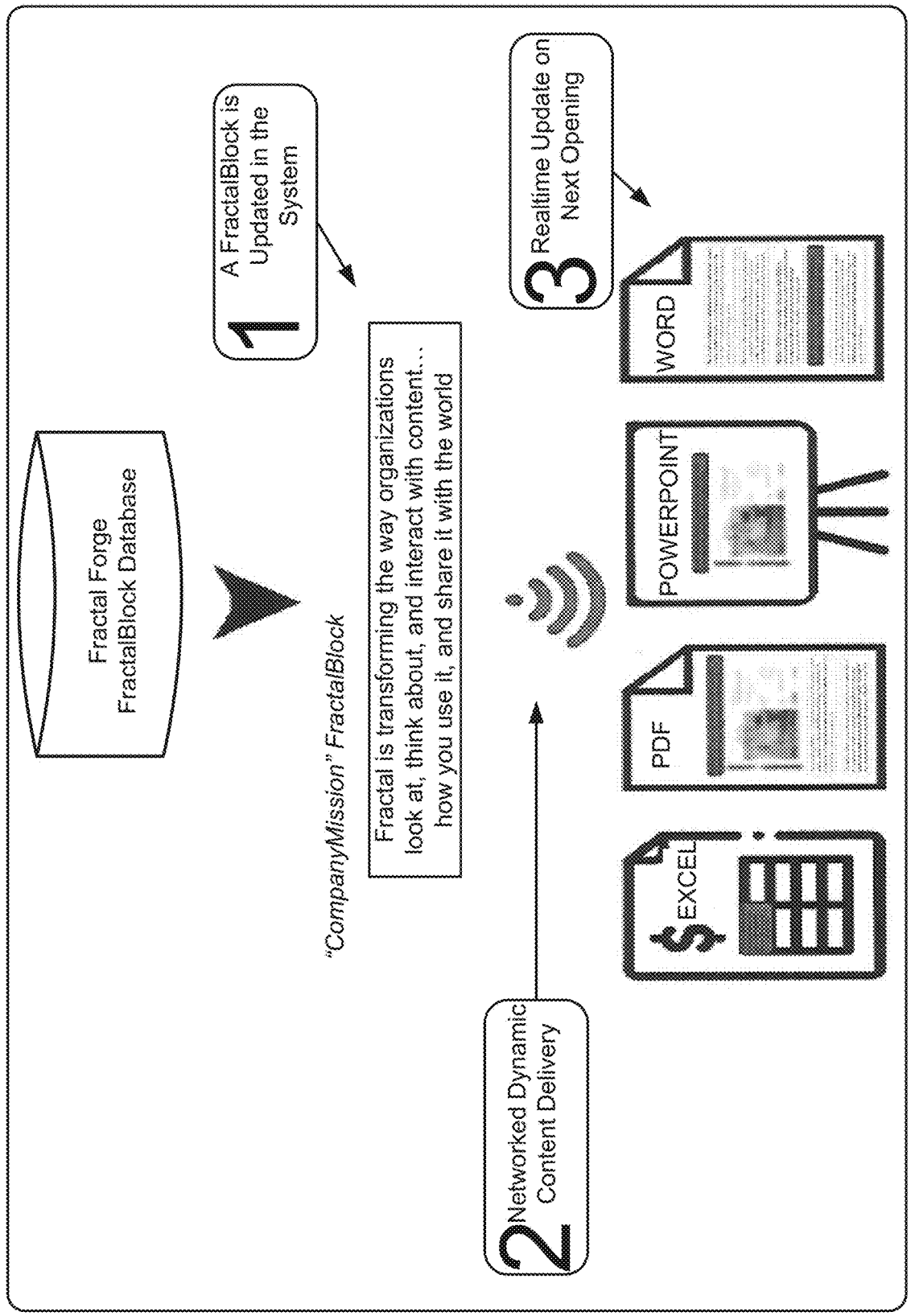
FIG. 11 is a schematic illustrating exemplary file formats for dynamically delivering content using the system of FIG. 1.

As shown in the embodiment of FIG. 11, once a document is opened, all portions of the document that contain files, such as .fractal files, transmit a request to the servers 103 to compare the content in the document with the version number stored in the database 105. The servers 103 may be configured to compare the content in the document with the database 105 each time the document is opened. If the version stored in the database 105 is newer than the content in the document, the document is at least partially updated based on the significance of the change. If the version found in the database 105 is the same as the content found in the users document, the document is not updated by the delivery sub-system 145.

In an embodiment, the user must either hover over or click on the text to see the content in the block. Once the user either hovers over or clicks on the text, the system 100 system generates a window associated with the specific block. The window displays information about the block to the user. The window will disappear after the user either clicks off the window or moves the cursor away from the block.

The delivery sub-system 145 is configured to identify the best form of communication, while also allowing a user to build the piece of content using their medium of choice, instead of necessarily selecting the medium recommended by the delivery sub-system 145. The delivery sub-system 145 delivers finalized content based on various information that the user provides to the system 100. Examples of such information includes, but is not limited to, the intended audience (internal or external); the time available to communicate (5 minutes, 2 hours, etc.); the presentation setting (board room, stage, bar, etc.); and whether it is personal interaction or online interaction.

After content is loaded in the system 100, certain actions, such as voice recognition of spoken key words within a business meeting, can trigger the delivery sub-system 145 to create or deliver content to the user relevant to the specific topic of the business meeting. Depending on the type of content being delivered, the user can select how they want to receive the final piece of content. Some exemplary ways of content delivery include via a download link or hosted within the system 100.

The system 100 also comprises a content machine 150 for each content medium, such as, but not limited to social media, scripts, video, PowerPoint, etc. The content machine 150 includes a server and is adapted to take an original block in text form and convert it to the proper medium for delivery. Specifically, the content machine 150 may combine blocks into chains and content containers in the system 100 in order to communicate a message and achieve one or a plurality of outcomes. The server of the content machine 150 is configured to combine data received from the system 100 and/or third-party systems and to complete messages using instructions received from the intelligence sub-system 110.

The system 100 further comprises an editing sub-system 165, which is adapted to finalize the blocks in the system 100. In some examples, raw video blocks are imported into the editing sub-system 155 and then separated into individual blocks. The blocks then undergo editing/correction/modification, which may involve color correction, audio mastering, and/or the addition of any special effects or pixel modifications to the block, as requested by the user.

Figure 4:
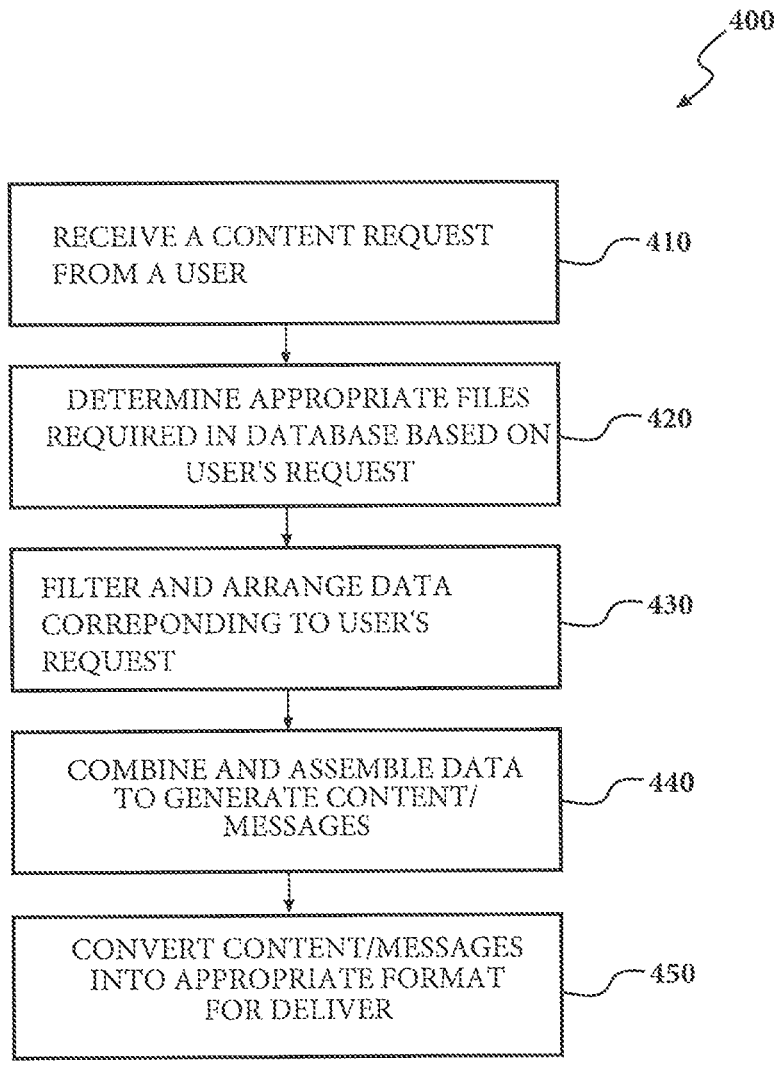
FIG. 4 is a flow chart illustrating an exemplary process for delivering content using the system of FIG. 1.

Referring to FIG. 4, FIG. 4 shows a flow chart illustrating an example method 400 of delivering content using the system 100 of FIG. 1. The method 400 commences at block 410 with the server of the processing sub-system 125 receiving a request for content remotely over the network 104 from a user device. As shown in block 420, the processing sub-system 125 then transmits the user request to a server on the management sub-system 120, which determines the appropriate files required in the database 105.

Next, as shown in block 430, the intelligence sub-system 110 prepares content for delivery using the files in the database 105 by filtering and arranging the data corresponding to one or more outcomes requested by the user. After receiving instructions from a server in the intelligence sub-system 110, a server in the content machine 150 combines data and completes one or more messages, as shown in block 440.

The messages are then converted into the proper format using a server on the rendering sub-system 135, as shown in block 450. In some examples, the format of the messages may be a video, a text, an audio, or the like. Next, the messages are transmitted to a server on the delivery sub-system 145 for delivery to the network 104 so that the messages may be communicated to a user device.

Figure 5:
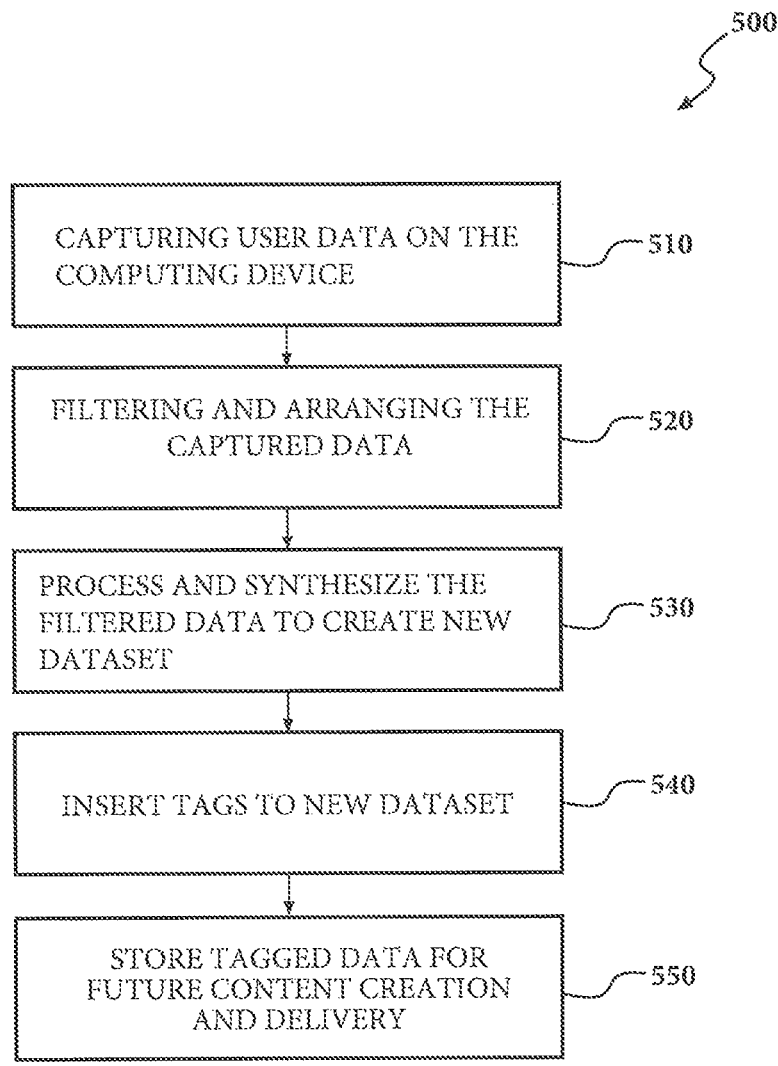
FIG. 5 is a flow chart illustrating an exemplary process for creating content using the system of FIG. 1.

Referring to FIG. 5, FIG. 5 shows a flow chart illustrating an example method 500 for creating content using the system 100 of FIG. 1. The method 500 commences at block 510 with capturing an environment and/or person using a recording instrument on the computing device 101. In some embodiments, the recording instrument is a camera, a virtual camera, a keyboard and mouse, a sensor, or the like. Any data that is captured is stored on the database 105 of the computing device 101, which may be a media card.

Next, as shown in block 620, the stored data is transmitted to a server on the management sub-system 120 for filtering and arranging of the data. Any raw data may be stored in the database 105. A server in the intelligence sub-system 110 then processes the data to create a new data set that may be used in other systems, as show in block 530.

Next, the data is transmitted from the intelligence sub-system 110 server to a server on the tagging sub-system 116, as shown in block 640. The tagging sub-system 115 uses the transmitted data to tag the content and/or data with appropriate information tags. As shown in block 650, the tagged data is then stored in the database for future content creation and delivery to users.

Figure 6:
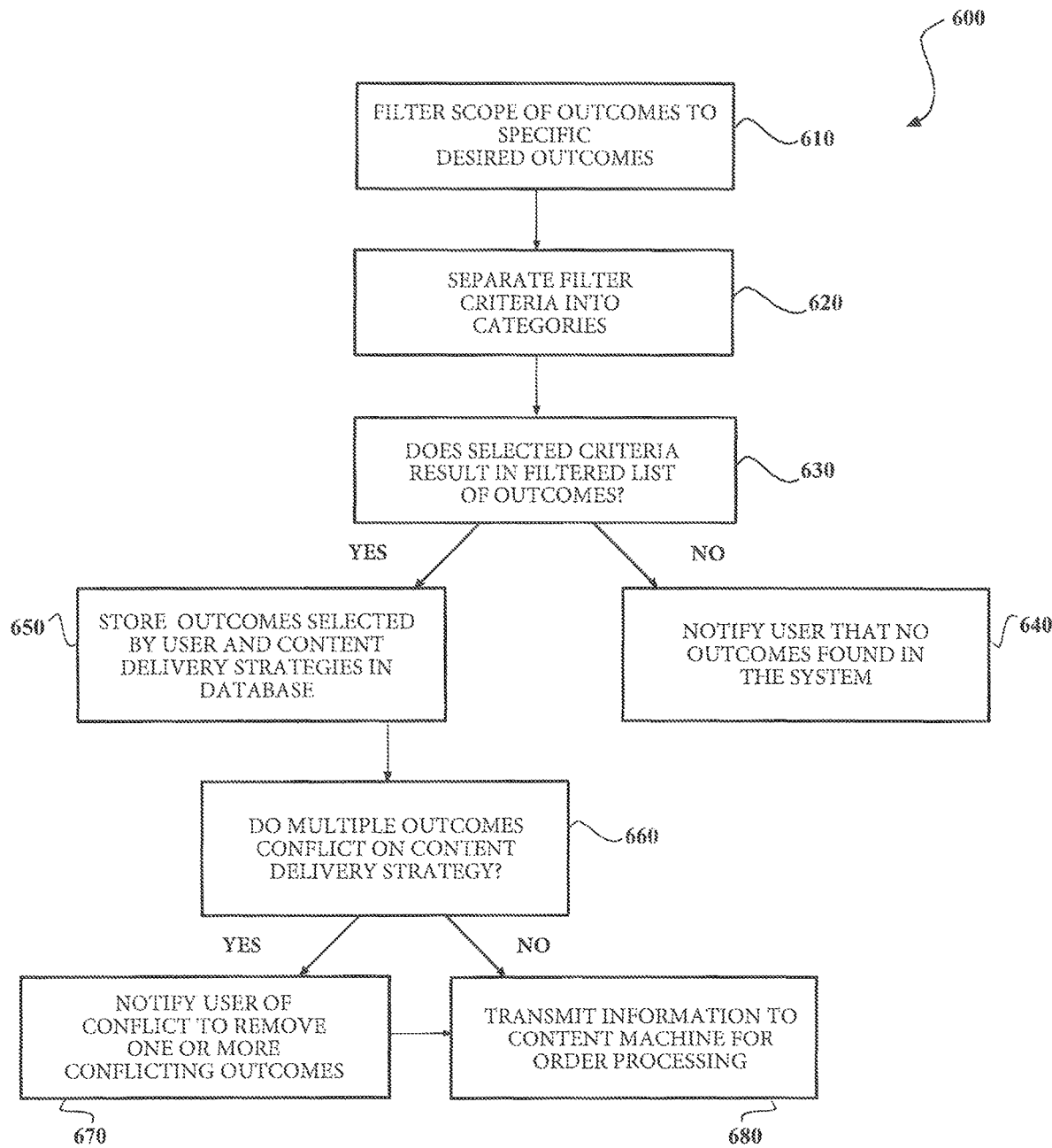
FIG. 6 is a flow chart illustrating an exemplary process for identifying outcomes used in the content machine.

Referring to FIG. 6, FIG. 6 shows a flow chart illustrating an exemplary process 600 for identifying outcomes (i.e. FractalOutcomes™) used in the content machine 150. The process 600 starts when a user identifies outcomes in the system 100 by filtering the scope of the outcomes from all available outcomes to the few desired for a specific need, as shown in block 610. Each outcome may be filtered using key characteristics of a particular outcome.

Next, as shown in block 620, the filter criteria are separated into categories for easy user identification and navigation. Examples of the filters include, but are not limited to, the following:
1. Organizational department (sales, communications, marketing, HR, executive, etc.);
2. Stage of relationship;
3. Stage in sales pipeline;
4. Content application type: education, awareness, excitement generation;
5. Channel of delivery (video, text, social media, press release, keynote address, presentation); and
6. State of the industry (rapid growth, stagnant, rapid decline).

In block 630, the system 100 determines whether or not the selected criteria results in a filtered list of outcomes in the system 100. If it does not, the user will be notified that no outcomes were found in the system 100 based on the selected criteria, as shown in block 640. In some examples, the user will be able to view a list of all of the possible outcomes of the system 100, without any filtering criteria, by clicking a separate button. At any point during the filtering process, a user may designate any number of specific outcomes to be stored to the database 105 and used by the content machine 150.

If there are a filtered list of outcomes in the system 100, the outcomes selected by the user and the content delivery strategies of the system 100 are then stored in the database 105, as shown in block 650.

As shown in block 660, if multiple outcomes in the system 100 are selected, these outcomes may conflict depending on the content delivery strategy that is selected. If a conflict does arise, the system 100 will present a notification to the user so that the user can remove one or more conflicting outcomes, as shown in block 670. In other examples, the conflict may exist with certain methods of delivery. In this case, the user may choose to change the method of content delivery, instead of the outcomes.

The system 100 determines conflicts between outcomes in the system 100 based on the medium through which the content is delivered. Each medium will have preconfigured conflicts for each outcome. As an example, two outcomes may conflict through the social media medium, but not conflict in video form or in presentation form. The system identifies preconfigured outcome conflicts by considering restrictions within that medium, like social media post length or video duration.

The information is then transmitted to the content machine 150 for order processing, as shown in block 680. In some examples, the content machine 150 only compiles a given piece of requested content at the very end of the method 300 in order to maximize its efficiency. Prior to that point, the content machine 150 creates one or more schematic files that hold all required data needed to create the final requested piece of content.

In some examples, four schematic files are created throughout the content machine 150. The first schematic is generated after identification of outcomes in the system 100 and the selection of a content delivery strategy, assuming conflicts have been resolved between these selections. This schematic is used as the reference file for the next steps of the process since it comprises the selected outcomes and the delivery strategies. In some embodiments, this schematic is known as the Outcome Schematic™.

In some examples, the block schematic is created next and contains the unordered selected blocks in the system 100. Then, the chain schematic is created and contains the selected blocks of the system 100 in ordered fashion. Finally, a schematic is created to hold a list of all chains in the system 100 in an ordered fashion. A master content creator can create a piece of content from this finalized schematic. In some embodiments, the schematic is known as the Master Content Container Schematic™.

In other embodiments, there may be less than four or greater than four schematics and the order of the schematics in the system may vary.

The schematics outlined above comprise information and data about the logic gateways and the delivery system 145. This information and data may be used by the master content creator. This data and information corresponding to the schematics may be contained within an XML file or any other type of data file. The final file format for housing the temporary data will depend on which file format best integrates the code of the delivery system 145.

Further, there are methods for identifying, sorting, ordering, and assembling various components within the system using the various tags in the system. One such methods may be used to identify relevant blocks in the system 100 by sorting the blocks with outcome tags that match the outcome tags found within the outcome schematic. In some embodiments, this method is known as the FractalLogic Outcome Gateway™.

Another method regulates how blocks pass through, are sorted, and are given priority status in the system for assembly into a chain in the system 100, such that a piece of content is created that is logical and easily understood. In some embodiments, this method is known as the FractalLogic Block Gateway™.

Yet another method regulates how chains pass through, are sorted, and are given priority status in the system for assembly into a master content container, such that a piece of content is created that is logical and easily understood. In some embodiments, this method is known as the FractalLogic Chain Gateway™.

Figure 7:
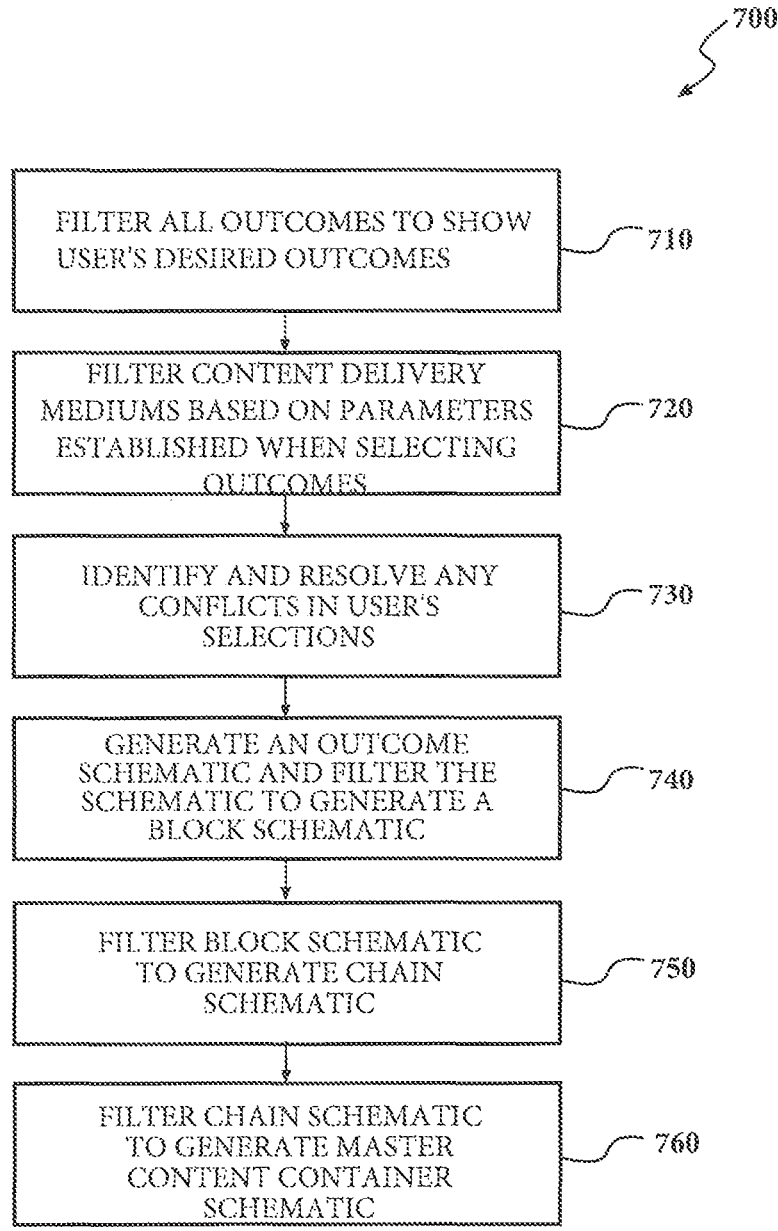
FIG. 7 is a flow chart illustrating an exemplary process for using the content machine of the system of FIG. 1 to communicate a message and to achieve one or more outcomes.

Referring to FIG. 7, FIG. 7 shows a flowchart illustrating an example method 700 of using the content machine 150 to communicate a message and achieve one or more outcomes. The method 700 commences at block 710 when the content machine 150 filters all outcomes (i.e. Fractal Outcomes™) to show only the desired outcomes based on the user's direction. Next, as shown in block 720, the content machine 150 filters all content delivery mediums based on parameters established when selecting the outcomes in block 710.

Then, the user's selections are cross-referenced and any conflicts in the contents are identified and resolved, as shown in block 730. The process continues if there are no conflicts and the content machine 150 generates an outcome schematic. The outcome schematic is then filtered through the Outcome Gateway to generate a block schematic, as shown in block 740.

The block schematic is then filtered through the Block Gateway to generate a chain schematic, as shown in block 760. The chain schematic is then filtered through the Chain Gateway to generate a master content container schematic, as shown in block 760. The master content container schematic is then adapted to create the piece of content in the desired medium. The delivery sub-system 145 uses the generated content and transmits the content to the requesting user based on the medium selected.

Once a master content container schematic has been created, a user may view the schematic and review the order and selection of blocks within the schematic. In some examples, an interactive interface may be present in the system 100 to enable the user to modify the order of the blocks or to completely remove, add, or replace blocks within other blocks. The interface may view the built-to-view score of each block in the schematic and analyze the order and strength of the message to assign an overall master container score, which may be known as a Fractal Master Content Container Built-to-View Score™.

Once a master content container schematic or outcome in the system 100 has been selected by a user, that final schematic or outcome is saved in a library within the intelligence sub-system 110 so that all users from a particular company/organization can view recent pieces of content previously created by the system 100. The library may also display statistics relevant to users being able to understand if a piece of content is beneficial using data points, such as the number of times a piece of finished content has been used; whether the content was successful in achieving an outcome in the system 100; and the user's satisfaction with a created piece of content. The previously created content that is stored in the library may be ranked with the highest-rated content appearing first.

The master container score will be dynamic as the order or blocks are modified by a user. The maximum possible master container score is 1.00 and reflects a perfect communication messages that fully makes sense, flows well, and has 100% viewer engagement for the entirety of the message. The lowest possible master container score is 0.00 and represents a message that makes no sense with nobody wanting to view the content of the message.

For example, when the content machine 150 receives a request to communicate the general overview of a company, the content machine 150 will filter the existing blocks in the system 100 down to the relevant blocks required to give a general overview of the company using the Outcome Gateway. The content machine 160 will then assemble the blocks using the Block Gateway into chains (i.e. FractalChains™). The chains will then be combined using the Chain Gateway into the system's master content file, which is delivered to the user through networked data transfer.

Once a block in the system 100 has been published in a medium, such as text, video, etc., a view counter may be incorporated in the intelligence sub-system 110 to collect data regarding the amount of people that have seen the block. This data is then displayed within the information for the block. The information regarding the number of views and percentage of the block viewed may be used to further establish the priority of blocks within a chain if two blocks end up having the same viewer engagement score. The block with a higher view count would take priority over the other block even if viewer engagement scores are the same.

When a viewer digitally accesses a block in the system 100, IP addresses, geolocation, browser type, computer type, software operating type, time of date, month, year, and all other possible data points may be captured by the intelligence sub-system 110.

Figure 8:
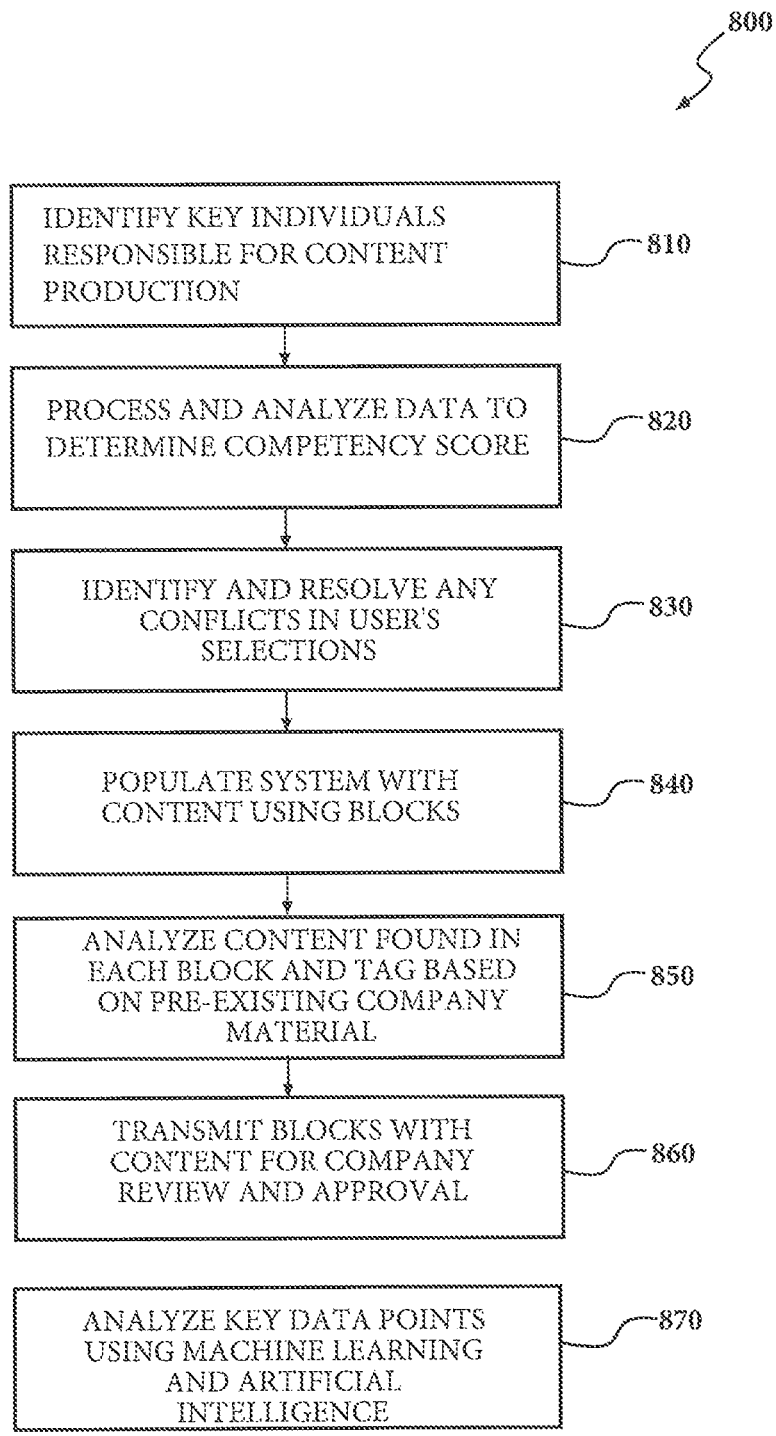
FIG. 8 is a flow chart illustrating an exemplary process for creating a framework for populating content into the database of the system of FIG. 1.

Referring to FIG. 8, FIG. 8 shows a flow chart illustrating an example method 800 of creating a framework for populating content into the database 105. The method 800 begins at block 810 by identifying the key people involved in the production of content, such as decision makers, funding sources, stakeholders, etc. The system 100 may use APIs to connect these people to the phases of content creation that require their direct involvement.

The system 100 must be adapted to understand the company's needs, areas for improvement, and pain points. Since each company's content and communication strategy are at different levels of maturity, a full review of current available content may be conducted by the intelligence sub-system 110 to understand what is available and what needs to be created, modified, or updated.

As shown at block 820, the system 100 then processes and analyzes the data to determine a score, such as a Fractal Competency Score™. The system 100 will then create a timeline and process for prioritizing the immediate needs of the company. In some examples, the system 100 determines a score out of 100 points to assess the organizational accuracy of communicated content and content use efficacy. The objective is for each user to reach a perfect organizational communication strategy based on criteria, such as interdepartmental communication, responsiveness, approval time, messaging approval timeliness, etc. In some embodiments, the score is known as a Fractal Competency Score™.

Next, as shown in block 830, a content strategy is implemented within the system 100 to provide the foundation for all future content creation. The content strategy identified information, such as ideal medium, tone, emotion, mood, clothing choice, background image, location, and environment that best embody the company.

The system 100 is then populated with content by the user or an administrator of the system 100, as shown in block 840 by the intelligence sub-system 110. All content is populated in the form of blocks, such as FractalBlocks™. The content may either be prepared by the user and directly inserted into the system 100 or the content may be established using the intelligence sub-system 110 for a specific block based on its understanding of how that company would approach such a block.

The content entered into each block is then analyzed by the intelligence sub-system 110 and tagged based on the review of pre-existing company material, as shown in block 850. In some examples, the intelligence sub-system 110 will make suggestions ensuring that the content is in accordance with other messaging from the company. In other examples, limited previous content from the company exists and the intelligence sub-system 110 will cross-reference the styles found within all new blocks in the system 100 to check for consistency in tone, emotion, etc.

Once consistency is evaluated, the intelligence sub-system 110 may assign each block a consistency score to communicate consistency levels to the user for review. The blocks are then processed through various forms of testing, including, but not limited to cultural, psychological, and/or kinesiological testing and respective scores/levels are assigned to each block. Those blocks having scores less than a predetermined score defined by the system 100, will be automatically flagged by the system 100 and sent for revision. The system 100 makes revisions and improvements, as necessary, based on the scores in each block.

In some examples, a block or a plurality of blocks in the system 100 will run through a psychological comprehension study prior to the text version of the block being finalized. In the comprehension study, statistics are collected to ensure the main themes of the block(s) are property communicated. Participants of the study will be presented with a block one at a time and give a predetermined amount of time (in seconds) to read the block before the text disappears. The participants will then be prompted to describe/explain/summarize what they read. The system 100 may generate a score, such as a Fractal Comprehension Score™, based on the participant's communication after reading the block.

In some examples, a word sentiment test may be conducted by the intelligence sub-system 110 after the block has been written in text form in order to identify the level of positivity or negativity of the block based on a scale from −100 to +100. Other tone-related analysis may also be performed in the block to identify if the text has qualities of excitement, energy, fun, fear, warning, nervousness, etc. In some embodiments, the score may be known as a Fractal Sentiment Score™.

In some examples, a score may analyze all other analytic data points from various performed studies and assign a specific weighted value to each score. The scores may then be combined to determine the overall score, which may be known as the Fractal Built-To-View Score™. The score will have a substantial impact on how blocks are chosen for various outcomes in the system 100 and will enable higher scoring blocks to replace lower scoring blocks if the system 100 determines that the blocks are interchangeable (or nearly interchangeable).

The intelligence sub-system 110 may also be adapted to evaluate a specific audience, such as another company, to determine which blocks in the system 100 most resonate with that company. Specifically, the intelligence sub-system 110 may review all publicly available information about the other company to determine what is most important to that company by understanding the sentiment of that company, frequency of certain words used, etc. The system 100 then uses that information and Identifies the outcomes and blocks that are most in accordance with the communications of that company and makes recommendations based on that information.

Next, the content Is reviewed, edited, and approved by appropriate representatives of the company, as shown in block 860. Blocks are sent to company representatives, such as project managers, through an online portal, which allows a user to either approve or request revision to a block. Approved content is then transmitted to a company's appropriate legal and regulatory representatives to ensure compliance with various rules, regulations, laws, such as HIPAA. The content may also be evaluated within the block to see if there is a need for content censorship. For example, customer NDA's may prohibit certain disclosures, and require some censorship within a block.

Once a block is approved, it will move into the approval stage where the block will be reviewed by appropriate company representatives to ensure that the content meets the company's expectations, such as cultural expectations in the region of deployment. In some examples, the blocks will also be translated to appropriate languages, as needed. Once the content is approved, it will be populated within the database, where it can be accessed for additional content creation.

After the text version of a block in the system 100 has been approved and finalized, a block communication speed score may be determined by calculating the duration of the block at a predetermined pace of words per minute. In some examples, the pace is 120 words per minute. The block is then compared in duration to the recommended duration of the same block incorporating the optimal communication time and the average duration of the same block for other companies. A communication speed score can then be computed for the block and compared with other blocks. In some embodiments, the score is known as a Fractal Communication Speed Score™.

After a block in the system 100 has been filmed and turned into a video, the block is run through an engagement test to determine how much of the block is actually being watched. Based on the amount of the block being watched, the average watch duration is divided by the total duration of the block. For example, if a viewer watched 10 seconds of a 15-second block, then the average watch duration is 66%.

The information is then used in conjunction with the tags to elevate the priority of certain blocks in a piece of content (written, video, etc.). For example, the system 100 may arrange blocks with a higher engagement score earlier in a piece of content. If the order of the blocks, based on the tags, in the system 100 is such that some of the blocks are interchangeable in order within a chain, then the blocks with the engagement closes to 1.00 may be given priority to appear first in a chain.

As shown in block 870, the system 100 uses machine learning and artificial intelligence to analyze key progress data points, including but not limited to time and the number of revisions required for each block to go through before it may be finally approved. This information is then used by the system 100 to tailor the review and block finalization process, which includes cultural review, translation, executive approval, etc. to optimize the flow for efficiency.

The system 100 is configured to operate with any content in any medium. Due to the complexities found within the creation of each content medium, a separate sub-system may be used to create content in each medium.

The system 100 stores multiple redundancies of the data to ensure constant uptime and data protection. The system encrypts the data so that it cannot be accessed without direct involvement by a system administrator. Users may obtain an encrypted backup copy of the data from the system.

Overtime, some blocks in the system 100 will become outdated and may need to be replaced. The system 100 may replace a block using a block archive system that requires permission from either an administrator of the system 100 or the user. A user may flag a block in the system 100 for deletion, for archive, or other options to request it be removed from circulation in the system 100.

Archived blocks are sent to an archive section of the database 105, wherein the blocks are dated and tagged with relevant data, such as the information associated with the intelligence sub-system 110. In some embodiments, the archived section may be known as FractalBlock Archive™. If needed, these blocks may be brought back into circulation in the system 100 upon request from an administrator. Whenever a block is replaced in the system 100, the old blocks remains in rotation until the new block replaces it. At that point, the old block will be archived.

In some examples, the system 100 comprises a content score based on additional data associated with the intelligence sub-system 110. The content score may be adapted to determine the age of a block based on the date that the block was created in the system 100; flag certain blocks for a refresh after a certain number of days since the last update in the system 100 has been reached; and compare new versus old versions of a block to determine the amount of deviations between the versions based on sentiment, tone, word choice, keywords, etc. As a result, the blocks that are the most changed may be captured first in text mediums. In some embodiments, the content score is known as the Fractal Stale Content Score™.

Figure 9:
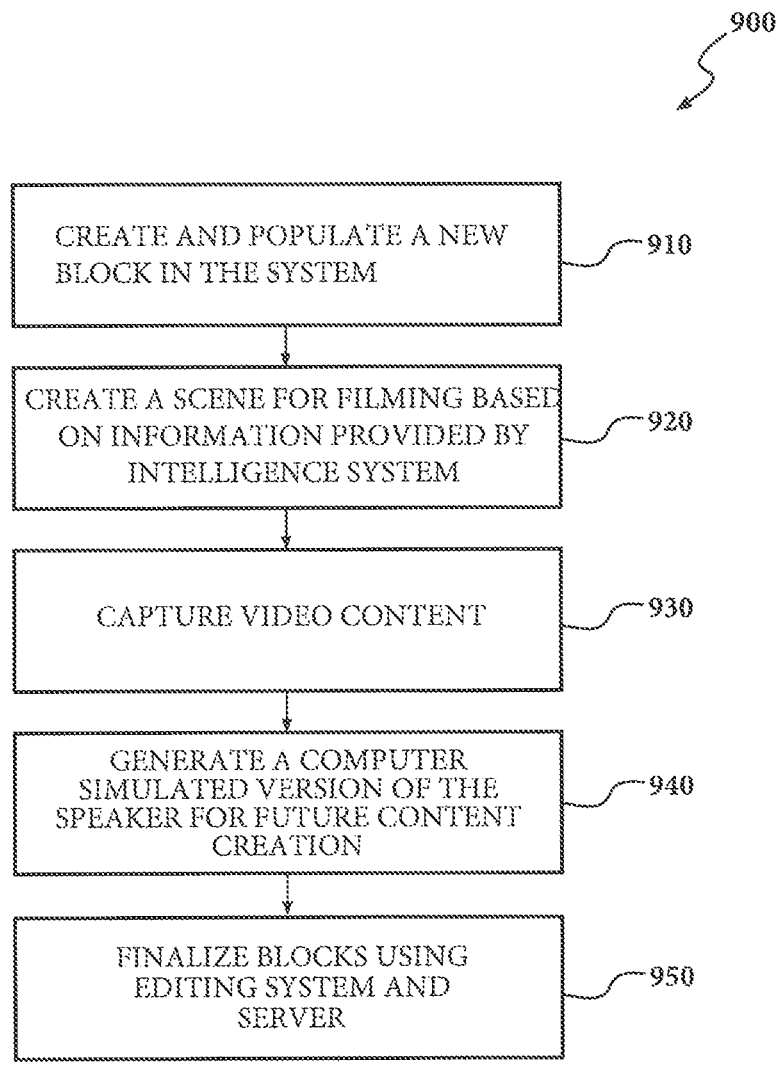
FIG. 9 is a flow chart illustrating an exemplary process for creating a video block in the system of FIG. 1.

Referring to FIG. 9, FIG. 9 shows an exemplary method 900 for creating a video block in the system 100. As shown in block 910, the system 100 first creates and populates a new block in the system, which is approved and sent to the production database.

After contacting the appropriate representatives for a specific block using the manifestation tag associated with the block, information regarding the specific tone, emotion, pacing, and other creative elements of the block are provided through the intelligence sub-system 110. The information provided by the intelligence sub-system 110 allows for creation of a scene for consistent filming, as shown in block 920. When a block is captured for the first time with a specific speaker, the location of all items revealed in the scene are captured within a continuity data file to ensure future filing dates will be able to be recreated in the same manner. If a speaker has previously been filmed using the system, continuity data from past shoots is referenced.

The appropriate equipment is setup for filming and then special equipment is used for capturing continuity data to ensure camera position, lighting, and other parameters are all able to be recreated exactly. Examples of this equipment include, but are not limited to tape measures, infrared depth mapping technology, 3-dimensional modeling generated camera, and artificial intelligence object image processing for object identification and labeling. If this is not the first shoot, then the existing data is referenced in the database 105. The speaker on the video is prepared for being on camera by identifying parameters, such as the speaker's clothing, hairstyle, and posture.

Next, the capturing of video content is initiated, as shown in block 930. If this is the first time a speaker is on camera, appropriate legal documentation, such as talent release forms, will be collected and referenced in the legal tag of the system.

Once enough content has been captured from a specific speaker for machine learning to effectively understand how that person behaves and speaks, the intelligence sub-system 110 creates a computer simulated version of the speaker to aid in future content creation, as shown in block 940. In some examples, the Intelligence sub-system 110 is used to create content for a specific block. In other examples, the intelligence sub-system 110 does not create content for a specific block. However, the data in the system 100 is still available for use in the event that the person is not available for participation in the creation of the content for the block.

In some examples, the system 100 may use artificial intelligence to guide the speaker on camera to the ideal delivery of the message. The intelligence sub-system 110 may use artificial intelligence to evaluate and analyze characteristics, such as body language, intonation, speed of words, pronunciation, energy, emotion, etc. The system 100 will then provide feedback in a specific way to allow an individual to adjust their characteristics to best fit the company's brand, while also ensuring that the individual is portrayed as trustworthy, interesting, reliable, etc.

For complex improvements, the intelligence sub-system 110 may also provide multiple steps to correct or improve in one specific area, such as body language. The intelligence sub-system 110 may also order the improvement steps in a way so as to most easily and quickly allow the individual to achieve the required results. For example, the first step may be improving energy, followed by speed of word, then pronunciation, then Intonation, then body language, etc.

As the intelligence sub-system 110 coaches the individual, the intelligence sub-system 110 will continuously analyze each version and make any additional refinements to the coaching strategy, as may be required. Multiple coaching sessions may be required to allow the speaker to reach a certain accuracy level when compared to other speakers at that same company. The intelligence sub-system 110 may also assess an individual's fatigue level to determine if a maximum amount of coaching has been reached for a specific day. The intelligence sub-system 110 may also have a text-to-speech interface and/or a digital replica of a human (i.e. avatar) to ensure the individual being coached can receive a rich coaching experience by watching the avatar perform example improvements on delivery. These example improvements may be stored in the database 106 for future coaching situations. As such, content may either be communicated either through a human individual or automated through a machine.

Coaching sessions may involve a looping progression where the same interaction/statement/line/scenario is delivered multiple times. During each looping progression, a new piece of specific feedback is provided to the speaker that is expected to be used the next time that the interaction/statement/line is delivered. The result is the continued improvement of the speaker. As the speaker progresses over time, multiple scenarios may be experienced to give the speaker a better understanding of how to behave in a variety of interactions.

The feedback loop may occur until the speaker is able to successfully deliver the message that meets the appropriate criteria with a specific amount of accuracy. The knowledge gained from specific scenarios may be applied to new and different scenarios because of a person's ability to learn how to communicate. This process differs from other unrehearsed interactions as unrehearsed interactions are unpredictable or require more iterations to learn as there are more variables to be analyzed.

The version of the content generated by the intelligence sub-system 110 is meant to be entirely indistinguishable from the actual person, in appearance, attitude, intonation, and every other human characteristic. The process for using the intelligence sub-system 110 described herein may also be adapted for use with non-speaking video content capture.

Once the process for one or a plurality of required blocks in the system 100 has been completed, the blocks are finalized through the use of the editing sub-system 165 to configure the blocks for use by the system 100, as shown in block 950. In some examples, raw video blocks are imported into the editing sub-system 155 and then separated into individual blocks. The blocks then undergo editing/correction/modification, which may involve color correction, audio mastering, and/or the addition of any special effects or pixel modifications to the block, as requested by the user. These blocks are then subjected to the same legal and compliance review process as the text blocks noted above. Once they are approved, the video blocks are then ready for use in the system 100 to create new content and are stored in the database 105.

Figure 10:
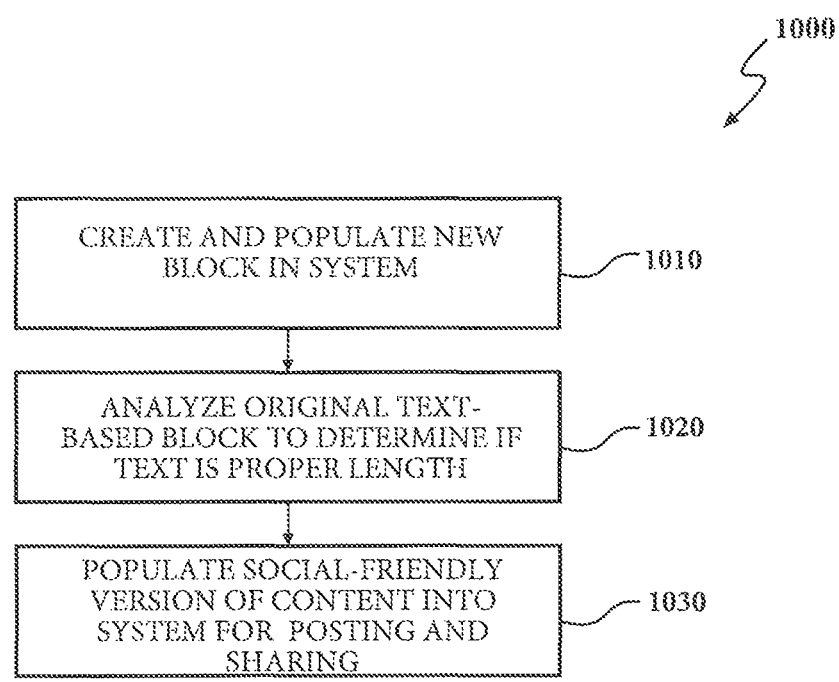
FIG. 10 is a flow chart illustrating an exemplary process for creating a social media block in the system of FIG. 1.

Referring to FIG. 10, FIG. 10 shows an exemplary method 1000 for creating a social media block in the system 100. As shown in block 1010, the system 100 first creates and populates a new block, which is approved and sent to the production database.

Next, as shown in block 1020, the content machine 150 for Social Media analyzes the original text-based block using the intelligence sub-system 110 to determine if the text is in a proper length for social media posts. If the post is too long, the intelligence sub-system 110 is configured to determine how to best truncate the message for use in social media; how to best compile a list of the most relevant social media hashtags for the social media post; and call upon the corresponding video block to include in the post.

After the social friendly version of the content has been created, it is populated into the system where users can post and share it, as shown in block 1030. Prior to sharing the social media post, the system 100 first checks on the required representative for that specific block using the manifestation tag to verify that the person has authority to post that social block. In some embodiments, there may be certain blocks that only the company's social pages or the CEO's social pages will be allowed to post, and a lower level employee would not be allowed to post that specific block.

The system 100 disclosed herein may be used for various types of applications, such as company-wide communications and user-specific communications, such as social media and interpersonal communications. There are numerous potential end users for the system 100, such as companies, individuals, agencies, associations, government, etc.

The figures provided herein are merely representational and may not be drawn to scale. Certain proportions thereof may be exaggerated, while others may be minimized. Accordingly, the specification and drawings are to be regarded in an illustrative rather than a restrictive sense. It will, of course, be understood that, although particular embodiments have just been described, the claimed subject matter is not limited in scope to a particular embodiment or implementation. Likewise, an embodiment may be implemented in any combination of systems, methods, or products made by a process, for example.

In the preceding description, various aspects of claimed subject have been described. For purposes of explanation, specific numbers, systems, and/or configurations were set forth to provide a thorough understanding of claimed subject matter. Computer file types and languages, and operating system examples have been used for purposes of illustrating a particular example. However, it should be apparent to one skilled in the art having the benefit of this disclosure that claimed subject matter may be practiced with many other computer languages, operating systems, file types, and without these specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that claims are intended to cover all such modifications or changes as fall within the true spirit of claimed subject matter.

The invention claimed is:

1. A computer-implemented method for creating video content, comprising:
    capturing, by a computer system, video content of a subject providing both visual data and audio data within a scene;
    capturing, by the computer system from continuity equipment, continuity data that included parameters associated with the scene during recording of the video content of the subject;
    determining, by the computer system, whether a threshold amount of the video content and the continuity data has been captured;
    in response to determining that the threshold amount of the video content and the continuity data has been captured, creating, by the computer system and an intelligence subsystem that includes a machine learning algorithm, a computer simulated version of the subject;
    creating, by the computer system and the intelligence subsystem that includes the machine learning algorithm, additional video content for a video block based on information associated with the video block and the computer simulated version of the subject; and
    storing, by the computer system, the video block in a database.

2. The computer-implemented method of claim 1, further comprising:
    filtering and extracting, by the computer system, a plurality of tagged content blocks corresponding to one or more outcomes requested in a content request to generate a set of filtered tagged content blocks, wherein the video block is included in the set of filtered tagged content blocks,
    assembling, by the computer system, the set of filtered tagged content blocks to prepare content associated with the one or more outcomes; and
    providing, by the computer system, the content for delivery based on the content request.

3. The computer-implemented method of claim 1, wherein the continuity data includes continuity data from past video content of the subject.

4. The computer-implemented method of claim 1, further comprising:
    editing, by the computer system, the video block, wherein the video block stored in the database is an edited video block.

5. The computer-implemented method of claim 1, further comprising:
    inserting, by the computer system, one or more unique tags to the video block to generate a tagged video block, wherein the one or more unique tags indicate at least one of a relationship, an order, or a prioritization of the video block with respect to a second video block when assembling video blocks into content; and
    storing, by the computer system, the tagged video block in the database.

6. The computer-implemented method of claim 5, further comprising:
    receiving a content request;
    filtering and extracting a plurality of tagged video blocks from the database corresponding to one or more user-requested outcomes requested in the content request to generate a set of filtered tagged video blocks; and
    assembling the set of filtered tagged video blocks to prepare content associated with the one or more user-requested outcomes.

7. A non-transitory, computer-readable medium storing instructions that, when executed by one or more processors, effectuate operations comprising:
    capturing, by a computer system, video content of a subject providing both visual data and audio data within a scene;
    capturing, by the computer system from continuity equipment, continuity data that included parameters associated with the scene during recording of the video content of the subject;
    determining, by the computer system, whether a threshold amount of the video content and the continuity data has been captured;
    in response to determining that the threshold amount of the video content and the continuity data has been captured, creating, by the computer system and an intelligence subsystem that includes a machine learning algorithm, a computer simulated version of the subject;
    creating, by the computer system and the intelligence subsystem that includes the machine learning algorithm, additional video content for a video block based on information associated with the video block and the computer simulated version of the subject; and
    storing, by the computer system, the video block in a database.

8. The non-transitory, computer-readable medium of claim 7, wherein the operations further comprise:
    filtering and extracting, by the computer system, a plurality of tagged content blocks corresponding to one or more outcomes requested in a content request to generate a set of filtered tagged content blocks, wherein the video block is included in the set of filtered tagged content blocks, assembling, by the computer system, the set of filtered tagged content blocks to prepare content associated with the one or more outcomes; and providing, by the computer system, the content for delivery based on the content request.

9. The non-transitory, computer-readable medium of claim 7, wherein the continuity data includes continuity data from past video content of the subject.

10. The non-transitory, computer-readable medium of claim 7, wherein the operations further comprise:

editing, by the computer system, the video block, wherein the video block stored in the database is an edited video block.

11. The non-transitory, computer-readable medium of claim 7, wherein the operations further comprise:

inserting, by the computer system, one or more unique tags to the video block to generate a tagged video block, wherein the one or more unique tags indicate at least one of a relationship, an order, or a prioritization of the video block with respect to a second video block when assembling video blocks into content; and storing, by the computer system, the tagged video block in the database.

12. The non-transitory, computer-readable medium of claim 11, wherein the operations further comprise:

receiving a content request;

filtering and extracting a plurality of tagged video blocks from the database corresponding to one or more user-requested outcomes requested in the content request to generate a set of filtered tagged video blocks; and assembling the set of filtered tagged video blocks to prepare content associated with the one or more user-requested outcomes.

13. A system, comprising:

one or more processors; and memory storing instructions that when executed by the one or more processors cause the one or more processors to effectuate operations comprising:

capturing video content of a subject providing both visual data and audio data within a scene;

capturing, from continuity equipment, continuity data that included parameters associated with the scene during recording of the video content of the subject;

determining whether a threshold amount of the video content and the continuity data has been captured;

in response to determining that the threshold amount of the video content and the continuity data has been captured, creating, by an intelligence subsystem that includes a machine learning algorithm, a computer simulated version of the subject;

creating, by the intelligence subsystem that includes the machine learning algorithm, additional video content for a video block based on information associated with the video block and the computer simulated version of the subject; and storing the video block in a database.

14. The system of claim 13, wherein the operations further comprise:

filtering and extracting a plurality of tagged content blocks corresponding to one or more outcomes requested in a content request to generate a set of filtered tagged content blocks, wherein the video block is included in the set of filtered tagged content blocks, assembling the set of filtered tagged content blocks to prepare content associated with the one or more outcomes; and providing the content for delivery based on the content request.

15. The system of claim 13, wherein the continuity data includes continuity data from past video content of the subject.

16. The system of claim 13, wherein the operations further comprise:

editing the video block, wherein the video block stored in the database is an edited video block.

17. The system of claim 13, wherein the operations further comprise:

inserting one or more unique tags to the video block to generate a tagged video block, wherein the one or more unique tags indicate at least one of a relationship, an order, or a prioritization of the video block with respect to a second video block when assembling video blocks into content; and storing the tagged video block in the database.

18. The system of claim 17, wherein the operations further comprise:

receiving a content request;

filtering and extracting a plurality of tagged video blocks from the database corresponding to one or more user-requested outcomes requested in the content request to generate a set of filtered tagged video blocks; and assembling the set of filtered tagged video blocks to prepare content associated with the one or more user-requested outcomes.

\* \* \* \* \*